(12) United States Patent
Okamura et al.

(10) Patent No.: US 12,318,732 B2
(45) Date of Patent: Jun. 3, 2025

(54) HOLLOW FIBER MEMBRANE MODULE

(71) Applicant: TOYOBO CO., LTD., Osaka (JP)

(72) Inventors: Tomohiro Okamura, Iwakuni (JP); Hiroyuki Yoshida, Iwakuni (JP); Hideki Mihara, Iwakuni (JP); Mikio Katsube, Iwakuni (JP)

(73) Assignee: TOYOBO MC CORPORATION, Osaka (JP)

( * ) Notice: Subject to any disclaimer, the term of this patent is extended or adjusted under 35 U.S.C. 154(b) by 421 days.

(21) Appl. No.: 17/787,989

(22) PCT Filed: Dec. 17, 2020

(86) PCT No.: PCT/JP2020/047220
§ 371 (c)(1),
(2) Date: Jun. 22, 2022

(87) PCT Pub. No.: WO2021/132027
PCT Pub. Date: Jul. 1, 2021

(65) Prior Publication Data
US 2023/0025401 A1 Jan. 26, 2023

(30) Foreign Application Priority Data
Dec. 25, 2019 (JP) .................. 2019-234410

(51) Int. Cl.
*B01D 63/04* (2006.01)
*B01D 63/02* (2006.01)
*C02F 1/44* (2023.01)

(52) U.S. Cl.
CPC ......... *B01D 63/04* (2013.01); *B01D 63/0225* (2022.08); *C02F 1/44* (2013.01)

(58) Field of Classification Search
None
See application file for complete search history.

(56) References Cited

U.S. PATENT DOCUMENTS 4,080,296 A 3/1978 Clark
4,670,145 A 6/1987 Edwards
(Continued)

FOREIGN PATENT DOCUMENTS

CN 101663083 A 3/2010
CN 106621819 A 5/2017
(Continued)

OTHER PUBLICATIONS

Eckman et al., "The Hollow-Fiber Cartridge™—Development and Commercialization of an Entirely New Reverse Osmosis Device/Technology", Technical Paper, DuPont de Nemours, Inc., 1997, cited in Specification (19 pages).
(Continued)

*Primary Examiner* — Krishnan S Menon
(74) *Attorney, Agent, or Firm* — WHDA, LLP

(57) ABSTRACT

A hollow fiber membrane module includes a pressure vessel, a plurality of hollow fiber membrane elements arranged in series inside the pressure vessel, and a connector that connects the hollow fiber membrane elements to each other. Each of the hollow fiber membrane elements includes a plurality of hollow fiber membranes, and a double-core tube extending in a longitudinal direction of the plurality of hollow fiber membrane elements. The connector includes a first channel and a second channel that do not communicate with each other. Between the hollow fiber membrane elements, the outer channels of the hollow fiber membrane elements are connected to each other through the first channel, the inner channels of the hollow fiber membrane elements are connected to each other through the second channel, and hollow portions of the hollow fiber membranes communicate with the inner channels through the second channel.

9 Claims, 7 Drawing Sheets

(56) References Cited

U.S. PATENT DOCUMENTS

| | | | |
|---|---|---|---|
| 2006/0144777 A1* | 7/2006 | Kumano | B01D 61/026 210/321.89 |
| 2006/0151375 A1 | 7/2006 | Marui et al. | |
| 2010/0155334 A1 | 6/2010 | Taniguchi et al. | |
| 2021/0069649 A1 | 3/2021 | Katsube et al. | |

FOREIGN PATENT DOCUMENTS

| | | | |
|---|---|---|---|
| JP | 53-119788 | A | 10/1978 |
| JP | H06-218242 | A | 8/1994 |
| JP | 7-500281 | A | 1/1995 |
| JP | H07-194943 | A | 8/1995 |
| JP | 9-511447 | A | 11/1997 |
| JP | 2003-290633 | A | 10/2003 |
| JP | 2008-86906 | A | 4/2008 |
| JP | 2012-045453 | A | 3/2012 |
| JP | 2012-115747 | A | 6/2012 |
| JP | 2014-184402 | A | 10/2014 |
| JP | 2015-160157 | A | 9/2015 |
| JP | 2015-226864 | A | 12/2015 |
| JP | 2017-074567 | A | 4/2017 |
| JP | 2019-25405 | A | 2/2019 |
| JP | 2019-051451 | A | 4/2019 |
| KR | 10-1571479 | B1 | 11/2015 |
| WO | 93/07958 | A1 | 4/1993 |
| WO | 96/08306 | A1 | 3/1996 |
| WO | 2004/069391 | A1 | 8/2004 |
| WO | 2013/025375 | A2 | 2/2013 |
| WO | 2015/125755 | A1 | 8/2015 |
| WO | 2015/129674 | A1 | 9/2015 |

OTHER PUBLICATIONS

International Search Report dated Feb. 16, 2021, issued in counterpart International Application No. PCT/JP2020/047220 (3 pages).
Office Action dated May 4, 2023, issued in counterpart CN application No. 202080090202.3, with English translation. (11 pages).
Office Action dated May 9, 2024, issued in counterpart SA Application No. 522433128, with English translation. (11 pages).
Office Action dated Sep. 26, 2023, issued in counterpart JP Application No. 2019-234410, with English translation. (9 pages).

* cited by examiner

HOLLOW FIBER MEMBRANE MODULE

TECHNICAL FIELD

The present invention relates to a hollow fiber membrane module.

BACKGROUND ART

For example, as one method for making a large reverse osmosis treatment plant for seawater desalination compact, the ratio of hollow fiber membranes per reverse osmosis membrane module may be increased (the ratio of a pressure vessel may be reduced) by increasing the length of the pressure vessel of the reverse osmosis membrane module and increasing the number of hollow fiber membrane elements housed in the pressure vessel. This increases the membrane area per reverse osmosis membrane module. Thus, it is possible to reduce the number of modules for the plant required for a predetermined treatment amount.

For example, PTL 1 (Japanese National Patent Publication No. 9-511447), PTL 2 (Japanese National Patent Publication No. 7-500281), and NPL 1 (DuPont de Nemours, Inc., Permasep, "The Hollow-Fiber Cartridge-Development and Commercialization of an Entirely New Reverse Osmosis Devise/Technology" Technical Paper, 1997) disclose a reverse osmosis membrane module including a plurality of hollow fiber membrane elements housed inside a pressure vessel, the hollow fiber membrane elements being connected to each other.

CITATION LIST

Patent Literature

PTL 1: Japanese National Patent Publication No. 9-511447
PTL 2: Japanese National Patent Publication No. 7-500281

Non Patent Literature

NPL 1: DuPont de Nemours, Inc., Permasep, "The Hollow-Fiber Cartridge-Development and Commercialization of an Entirely New Reverse Osmosis Devise/Technology" Technical Paper, 1997

SUMMARY OF INVENTION

Technical Problem

In the reverse osmosis membrane module including the plurality of hollow fiber membrane elements disclosed in the above citations, a space between an inner wall of the pressure vessel and each hollow fiber membrane module is partially sealed. Further, a feed liquid (e.g., seawater) is fed to the hollow fiber membrane module, and the feed liquid (concentrate) that has been concentrated while passing through the first hollow fiber membrane module is also fed to the hollow fiber membrane element in the next stage.

However, since the concentrated feed liquid is fed to the hollow fiber membrane elements in the second and subsequent stages, the amount of permeated water to be obtained gradually decreases, which disadvantageously reduces the overall treatment efficiency (water producing efficiency) of the reverse osmosis membrane module. Thus, in terms of improving the overall treatment efficiency of the reverse osmosis membrane module, it is desired that an unconcentrated (fresh) feed liquid be fed to all the hollow fiber membrane elements.

In view of the above problem, it is an object of the present invention to improve the overall treatment efficiency in a hollow fiber membrane module including a plurality of hollow fiber membrane elements.

Solution to Problem (1) A hollow fiber membrane module including:
a pressure vessel;
a plurality of hollow fiber membrane elements arranged in series inside the pressure vessel; and
a connector that connects the hollow fiber membrane elements to each other, wherein
the pressure vessel includes:
   a feed port for a feed liquid provided on one end in a longitudinal direction;
   a discharge port for the feed liquid provided on the other end in the longitudinal direction; and
   a recovery port for permeated water,
each of the hollow fiber membrane elements includes:
   a plurality of hollow fiber membranes; and
   a double-core tube extending in a longitudinal direction of the plurality of hollow fiber membrane elements,
the double-core tube includes a perforated distribution tithe, and an inner tube disposed inside the perforated distribution tube,
an outer channel defined by an inner wall of the perforated distribution tube and an outer wall of the inner tube communicates with the feed port and the discharge port,
an inner channel defined by an inner wall of the inner tube communicates with the recovery port,
the connector includes a first channel and a second channel that do not communicate with each other, and between the hollow fiber membrane elements,
the outer channels of the hollow fiber membrane elements are connected to each other through the first channel, and
the inner channels of the hollow fiber membrane elements are connected to each other through the second channel, and hollow portions of the hollow fiber membranes communicate with the inner channels through the second channel.

(2) The hollow fiber membrane module according to (1), wherein a clearance extending, in a longitudinal direction inside an inner wall of the pressure vessel is present between the hollow fiber membrane elements.

(3) The hollow fiber membrane module according to (1) or (2), wherein the second channel includes a main channel for connecting the inner channels to each other, and a branch channel that allows the hollow portions of the hollow fiber membrane element to communicate with the main channel.

(4) The hollow fiber membrane module according to any one of (1) to (3), wherein the hollow fiber membrane element has a cylindrical shape, has an outer diameter of 10 to 28 cm, and has a total length of 1000 to 2000 mm.

(5) The hollow Fiber membrane module according to any one of (1) to (4), wherein the plurality of hollow fiber membrane elements includes a hollow fiber membrane wound body including a plurality of hollow fiber membranes helically wound around the double-core tube.

Advantageous Effects of Invention

According to the present invention, it is possible to improve the overall treatment efficiency in a hollow fiber membrane module including a plurality of hollow fiber membrane elements.

DESCRIPTION OF EMBODIMENTS

Hereinbelow, an example of a hollow fiber membrane module of the present invention will be described with reference to the drawings. Note that identical reference signs designate identical or corresponding pans throughout the drawings. Further, the relationships in dimensions such as length, width, thickness, or depth are appropriately changed for clear and simple drawings and thus do not represent the actual dimensional relationships.

<Hollow Fiber Membrane Module>

Figure 1:
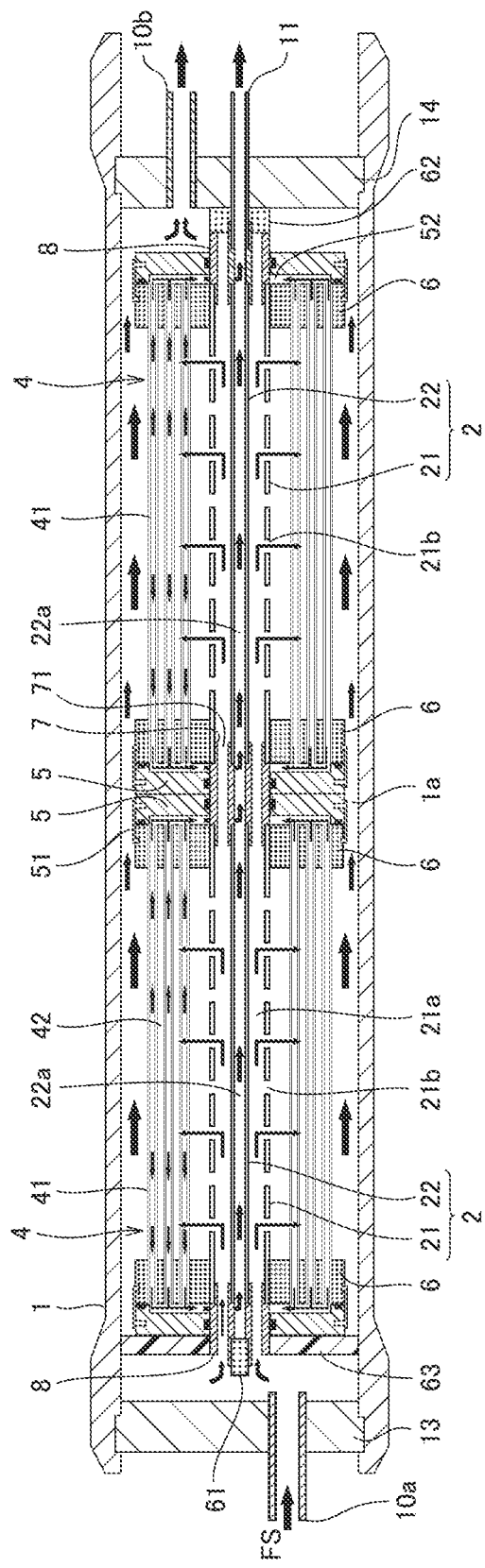
FIG. 1 is a schematic sectional view illustrating an example of a hollow fiber membrane module of an embodiment.
Figure 2:
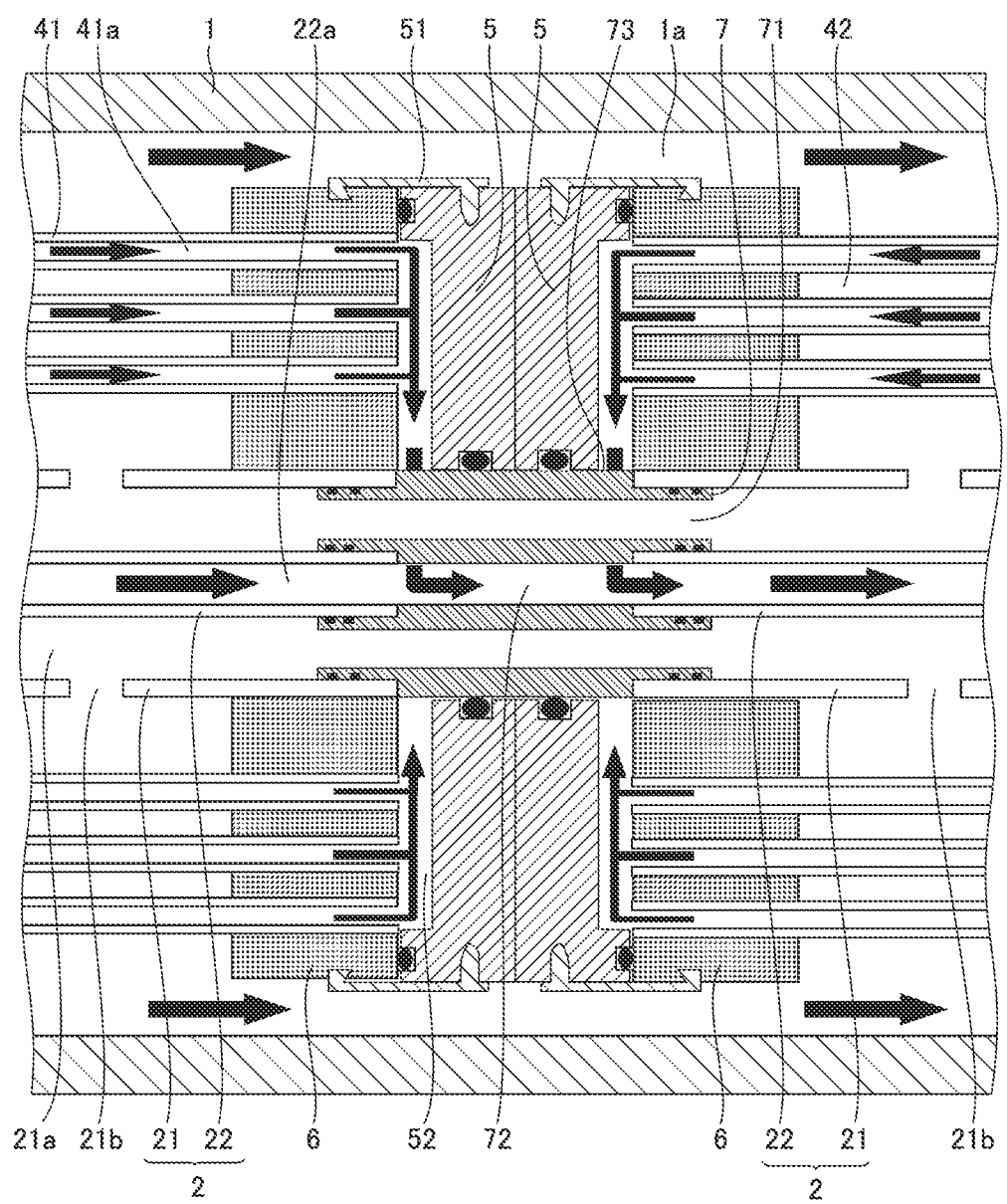
FIG. 2 is a schematic sectional view illustrating, in an enlarged manner, a connection between hollow fiber membrane elements of example of the hollow fiber membrane module of the embodiment.

With reference to FIGS. 1 and 2, the hollow fiber membrane module of the present embodiment includes:
a pressure vessel 1;
a plurality of hollow fiber membrane elements 4 arranged in series inside pressure vessel 1; and
a connector 7 which connects hollow fiber membrane elements 4 to each other.

(Pressure Vessel)

Pressure vessel 1 includes:
a feed port 10a for a feed liquid provided on one end in a longitudinal direction;
a discharge port 10b for the feed liquid (the concentrated feed liquid: the concentrate) provided on the other end in the longitudinal direction; and
a recovery port 11 for permeated water.

Note that, in FIG. 1, feed port 10a is provided on a wall member 13 of pressure vessel 1, and discharge port 10b and recovery port 11 are provided on another wall member 14 of the pressure vessel. Hollow fiber membrane elements 4 are arranged in series between two wall members 13 and 14.

(Hollow Fiber Membrane Element)

Each of hollow fiber membrane elements 4 includes:
a plurality of hollow fiber membranes 41; and
a double-core tube 2 extending in a longitudinal direction of the plurality of hollow fiber membrane elements 4.

Double-core tube 2 includes a perforated distribution tube 21, and an inner tube 22 disposed inside perforated distribution tube 21.

An outer channel 21a defined by an inner wall of perforated distribution tube and an outer wall of inner tube 22 communicates with feed port 10a and discharge port 10b.

An inner channel 22a defined by an inner wall of the inner tube 22 communicates with recovery port 11.

The number of hollow fiber membrane elements 4 housed inside one pressure vessel 1 is two or more, and preferably, but not particularly limited to, three or more.

The plurality of hollow fiber membranes 41 is disposed around double-core tube 2 disposed inside hollow fiber membrane element 4. Perforated distribution tube 21 and the plurality of hollow fiber membranes 41 are liquid-tightly fixed by resin walls 6 at both ends.

Note that each of hollow fiber membranes 41 has an opening at at least one end (preferably each end) thereof.

Perforated distribution tube 21 is a tubular body having a plurality of holes 21b. Perforated distribution tube 21 distributes, for example, a feed liquid, the feed liquid being fed into the hollow fiber membrane module through feed port 10a, to outside 42 of the hollow fiber membranes through outer channel 21a and holes 21b.

Note that the feed liquid is a liquid to be subjected to membrane treatment such as reverse osmosis treatment or forward osmosis treatment. The feed liquid is not limited to any particular liquid and may be any liquid containing water. The feed liquid may be either a solution or a suspension. Examples of the feed liquid include seawater, river water, brackish water, and waste water.

Holes 21b of perforated distribution tube 21 are preferably arranged radially in all directions. In addition, perforated distribution tube 21 is preferably located at substantially the center of hollow fiber membrane element 4.

If the diameter of perforated distribution tube 21 is too large, an area occupied by the hollow fiber membranes inside the hollow fiber membrane module decreases. As a result, the membrane area of hollow fiber membrane element 4 or the hollow fiber membrane module decreases, which may reduce the permeate flow rate per volume. If the diameter of the perforated distribution tube is too small, pressure loss caused while the feed fluid flows inside the perforated distribution tube increases. As a result, the effective differential pressure on the hollow fiber membranes decreases, which may reduce the treatment efficiency. This may also reduce the strength, and, as a result, the perforated distribution tube may be damaged due to the tension of the hollow fiber membranes applied to the perforated distribution tube when the feed fluid flows through a hollow fiber membrane layer. From these points of view, the ratio of the cross-sectional area of the perforated distribution tube (except the cross sectional area of the inner tube) to the cross-sectional area of hollow fiber membrane element 4 is preferably 4 to 20%.

Inner tube 22 extends in the longitudinal direction of the hollow fiber membrane element 4 inside perforated distribution tube 21. Note that inner tube 22 does not necessarily have to be parallel to the longitudinal direction of hollow fiber membrane element 4 and may be any tube passing through the hollow fiber membrane element 4 in the longitudinal direction.

In FIG. 1, one end of inner tube 22 opposite to the recovery: port 11 (the end facing the feed port 10a) is sealed with a plug 61. However, recovery port 11 may also be provided at the same side as feed port 10a.

Examples of a semipermeable membrane constituting the hollow fiber membrane used in the present embodiment include semipermeable membranes called a reverse osmosis membrane (RO membrane), a forward osmosis membrane (FO membrane), a nanofiltration membrane (NF membrane), and an ultrafiltration membrane (UF membrane). The semipermeable membrane is preferably a reverse osmosis membrane or a forward osmosis membrane, or a nanofiltration membrane. Note that, when a reverse osmosis membrane or a forward osmosis membrane, or a nanofiltration membrane is used as the semipermeable membrane, the pressure of the feed liquid is preferably 0.1 to 10.0 MPa, and more preferably 0.5 to 9.0 MPa.

Typically, the pore size of the RO membrane and the FO membrane is approximately 2 nm or less, whereas the pore size of the UF membrane is approximately 2 to 100 nm. The NF membrane is an RO membrane having a relatively low rejection to ions and salts, and typically has a pore size of approximately 1 to 2 nm. When the RO membrane, the FO membrane, or the NF membrane is used as the semipermeable membrane, the salt removal rate of the RO membrane, the FO membrane, or the NF membrane is preferably 90% or more.

The material constituting the semipermeable membrane is not limited to any particular material, and examples thereof include a cellulose-based resin, a polysulfone-based resin, a polyamide-based resin, and a polyvinyl-alcohol-based resin. The semipermeable membrane is preferably constituted of a material including at least a cellulose-based resin or a polyvinyl-alcohol-based resin.

The cellulose-based resin is preferably a cellulose-acetate-based resin. The cellulose-acetate-based resin is resistant to chlorine serving as a disinfectant and can inhibit the growth of microorganisms. The cellulose-acetate-based resin is preferably cellulose acetate and more preferably cellulose triacetate in view of durability.

The polyvinyl-alcohol-based resin is preferably a crosslinked polyvinyl alcohol resin.

Examples of the hollow fiber membrane include a membrane having a single layer structure and a membrane having a complex structure made of the same or different materials. The membrane having a single layer structure preferably has high structural consistency in the membrane thickness direction of the hollow fiber membrane. Examples of a measure of the structural consistency in the membrane thickness direction of the hollow fiber membrane include the Raman value of the hollow fiber membrane within the range of a predetermined value or more, and a small change in the structure when the cross section of the hollow fiber membrane is continuously observed in the membrane thickness direction using a scanning electron microscope (SEM) with a magnifying power of 5000.

The outer diameter of the hollow fiber membrane is not limited to any particular diameter and may be any diameter suitable for membrane treatment such as reverse osmosis treatment or forward osmosis treatment. The outer diameter of the hollow fiber membrane is, for example, 100 to 300 μm. However, in the present embodiment, the hollow fiber membrane includes a hollow fiber semipermeable membrane (may also be called a tubular semipermeable membrane) having a relatively large inner diameter of 1 mm or more.

The hollowness of the hollow fiber membrane is not limited to any particular rate and may be any hollowness suitable for membrane treatment such as reverse osmosis treatment or forward osmosis treatment. The hollowness of the hollow fiber membrane is, for example, 15 to 45%. If the hollowness is less than the above range, the hollow portion has a large flow pressure loss, and a desired permeate flow rate may thus not be achieved. If the hollowness is more than the above range, sufficient pressure resistance may not be ensured during osmosis treatment. Note that the hollowness (%) can be calculated by the equation: [hollowness (%)= (inner diameter/outer diameter)$^2 \times 100$].

Note that the hollow fiber membrane element has a larger membrane area per element than a spiral element including a spiral flat membrane. Thus, the hollow fiber membrane requires an extremely small treatment amount per unit membrane area to achieve a certain permeate flow rate and can reduce dirt on a membrane surface produced by the feed liquid as compared to the spiral membrane. Therefore, the operation time before need for membrane cleaning can be extended. Further, since an uneven flow is less likely to occur inside the module, the hollow fiber membrane is advantageous in increasing the permeation efficiency.

The plurality of hollow fiber membranes is preferably a hollow fiber membrane wound body formed by helically winding hollow fiber membranes or a bundle of hollow fiber membranes around the perforated distribution tube so that the hollow fiber membranes are radially stacked. In the hollow fiber membrane wound body, the hollow fiber membranes may be arranged in such a manner as to cross each other. Typically, the crossing arrangement forms regular voids at crossings between the hollow fiber membranes. Due to the presence of the regular voids, insoluble components, particle components, or the like in the fluid flowing outside the hollow fiber membranes are less likely to be caught between the hollow fiber membranes. Thus, an increase in pressure loss is less likely to occur.

The hollow fiber membrane wound body can be manufactured by a conventionally known method. As disclosed in, for example Japanese Patent No. 4412486, Japanese Patent No. 4277147, Japanese Patent No. 3591618, and Japanese Patent No. 3008886, 45 to 90 or more hollow fiber membranes are aggregated to obtain a single hollow fiber membrane aggregate, the hollow fiber membrane aggregates are arranged side by side to obtain a flat hollow fiber membrane bundle, and the hollow fiber membrane bundle is traversely wound around a perforated distribution tube having a large number of holes. At this time, the hollow fiber membrane bundle is wound so as to form crossings at specific positions on a peripheral face of the wound body by adjusting the length and rotational speed of the perforated distribution tube and the traverse speed of the hollow fiber membrane bundle.

Further, for example, hollow fiber membrane element 4 can be manufactured by sealing both ends of the hollow fiber membranes and the perforated distribution tube with a resin, and then partially cutting the resin to open both end portions of the hollow fiber membranes. For example, the hollow fiber membrane wound body described above is adjusted in length and positions of the crossings and cut at a predetermined position. Both end portions of the wound body are bonded, and both sides of the wound body are then cut. In this manner, a hollow fiber membrane element having openings at both ends of hollow fiber membranes can be manufactured.

(Connector)

With mainly reference to FIGS. 2 to 5, connector 7 includes a first channel 71 and a second channel 72 which do not communicate with each other.

Between hollow fiber membrane elements 4, outer channels 21*a* of hollow fiber membrane elements 4 are connected to each other through first channel 71, inner channels 22*a* of hollow fiber membrane elements 4 are connected to each other through second channel 72, and hollow portions 41a of hollow fiber membranes 41 communicate with inner channels 22a through second channel 72.

In FIGS. 2 to 5, second channel 72 includes a main channel (the channel extending in the horizontal direction in FIG. 2) for connecting inner channels 22a to each other, and a branch channel (the channel extending in the vertical direction through a hole 73 in FIG. 2) which allows hollow portions 41a of hollow fiber membrane elements 4 to communicate with the main channel.

Note that the cross-sectional area of a clearance 1a through which the concentrated feed liquid (concentrate) flows and the cross-sectional area of the outer channel of the double-core tube through which feed water flows are preferably 5 to 18% and 4 to 15% of the inner diameter reference cross-sectional area of the pressure vessel, respectively, and more preferably 7 to 15% and 6 to 12% (e.g. 12% and 10%), respectively so as to achieve a structure that does not cause contraction pressure loss. Accordingly, it is possible to reduce pressure loss that reduces the permeate flow rate.

With reference to FIGS. 1 and 2, annular members 5 are fitted to outer peripheral faces of connectors 7, 8. Annular member 5 and hollow fiber membrane element 4 are joined together with a snap 51.

Snap 51 is a member that fixes, in a fitted state, an end portion of hollow fiber membrane element 4 and annular member 5 on their outer peripheral faces to enable hollow fiber membrane element 4 and annular member 5 to be reversibly attached and detached and to be fixed. The fitted state is a state in which a projection on one end of snap 51 is fitted in a recess on an end portion of hollow fiber membrane element 4 (a side face of resin wall 6), and a projection on the other end of snap 51 is fitted in a recess on a side face of annular member 5. Although snap 51 is detached by forcibly applying a sufficient force thereto from outside, snap 51 does not come off on its own (refer to WO 2005-011850).

Further, hollow portions 41a of hollow fiber membranes 41 communicate with second channel 72 (hole 73) of connector 7 through a recess 52 of annular member 5.

Figure 6:
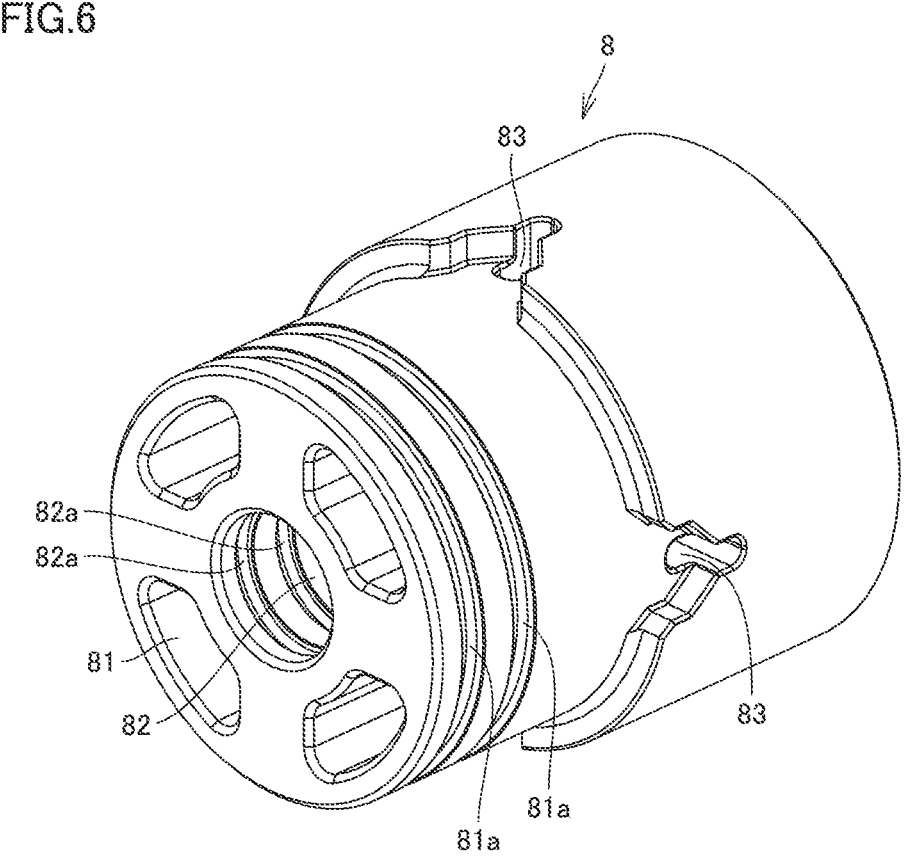
FIG. 6 is a perspective view of another connector used in the embodiment.
Figure 7:
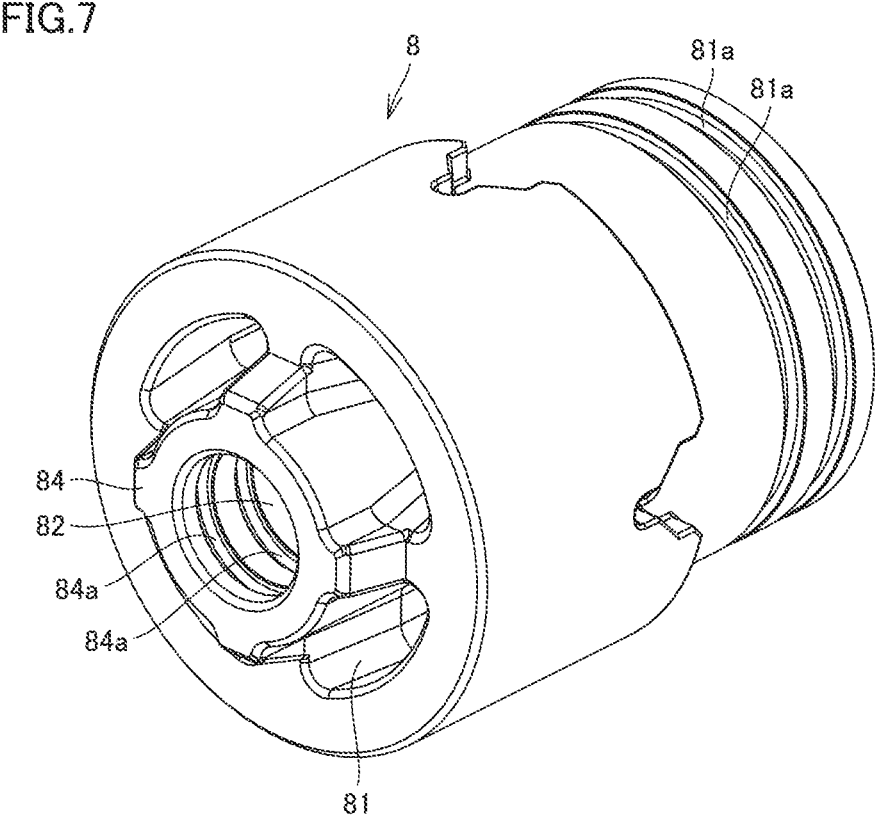
FIG. 7 is a perspective view of the connector of FIG. 6 viewed from the opposite side.

With mainly reference to FIGS. 1, 6, and 7, a connector 8 is used at each end of the connected hollow fiber membrane elements 4. Connector 8 is different from connector 7, which connects double-core tubes 2 of hollow fiber membrane elements 4 to each other. Connector 8 is a member having a length corresponding to half the length of connector 7. At the side corresponding to discharge port 10b, a second channel 82 (projection 84) of connector 8 is connected to recovery port 11, and a first channel 81 of connector 8 is sealed with a plug 62 having an annular shape. At the side corresponding to feed port 10a, second channel 82 (projection 84) of connector 8 is sealed with plug 61, and first channel 81 of connector 8 communicates with feed port 10a. Note that connector 8 facing feed port 10a is supported by a support wall 63.

Figure 3:
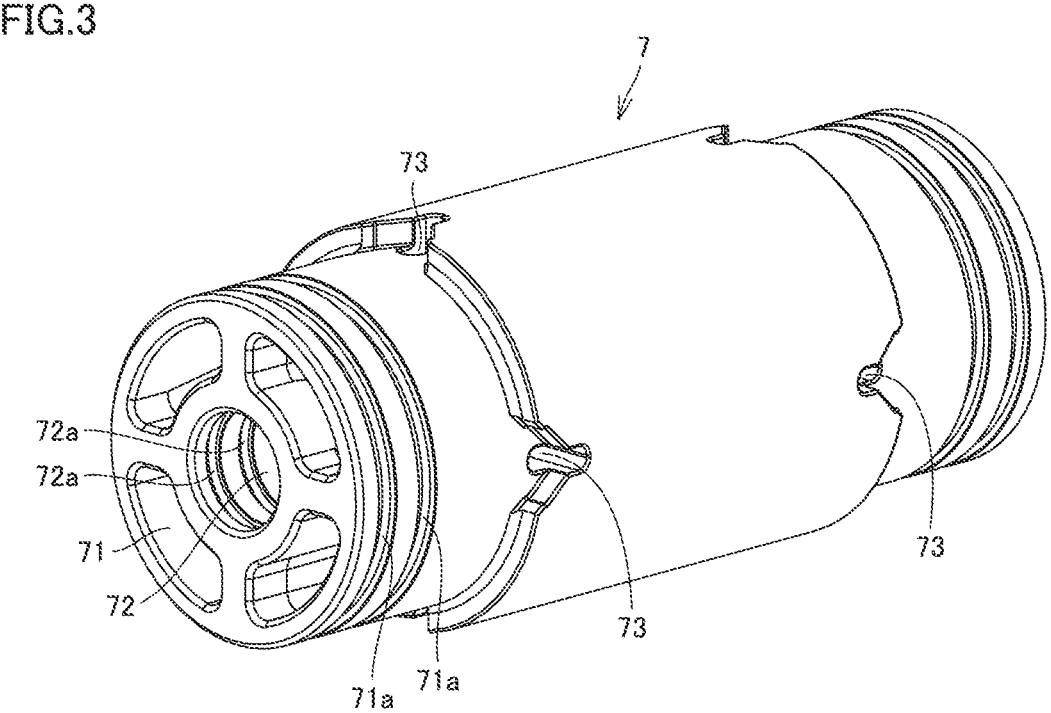
FIG. 3 is a perspective view of a connector used in the embodiment.
Figure 4:
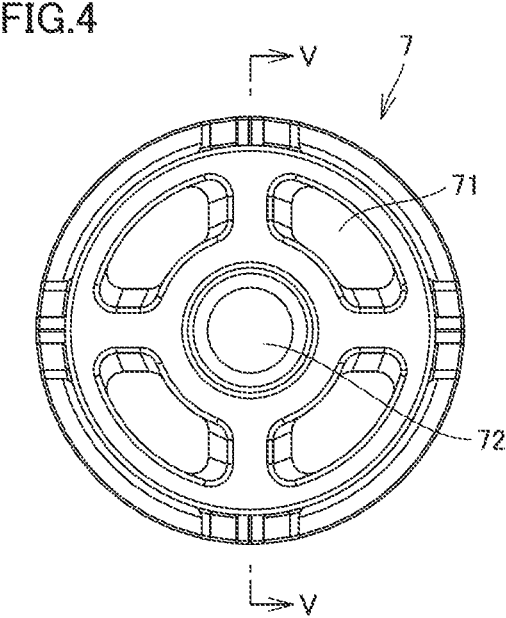
FIG. 4 is a front view of the connector used in the embodiment.
Figure 5:
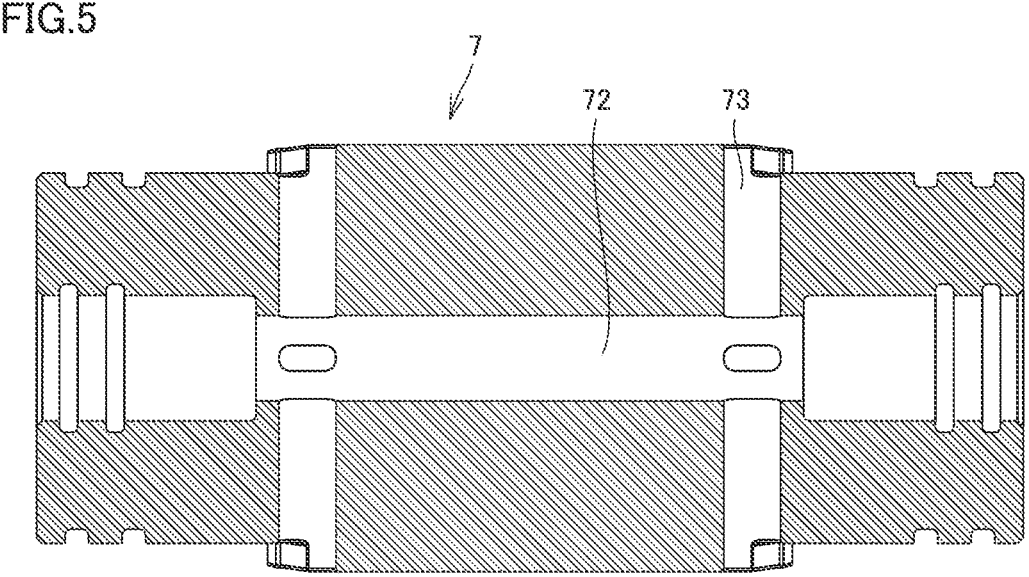
FIG. 5 is a sectional view taken along line V-V of FIG. 4.

With reference to FIGS. 3, 6, and 7, O-rings are attached to grooves 71a, 72a, 81a, 82a, and 84a so as to seal connections between connectors 7, 8 and other members.

Further, although FIGS. 3 to 7 illustrate connector 7 including, four first channels 71 and connector 8 including four first channels 81, the number of first channels 71, 81 is not limited to any particular number and may be three.

The material constituting connectors 7, 8 is not limited to any particular material, and examples thereof include polyphenylene sulfide (PPS), polyphenylene ether (PPE), polyacetal (POM), polyvinyl chloride (PVC), polyetheretherketone (PEEK), and acrylonitrile-butadiene-styrene (ABS) resins.

The connector is used in seawater at 5 to 40° C. Thus, expansion of a component of the connector results in poor fitting with another component, whereas shrinkage of the component of the connector disables sealing of the O-rings. Thus, it is preferred that a material having a low dimensional change rate be used. In view of this, it is preferred that the water absorption and linear expansion coefficient related to the dimensional change rate be low. Note that a material having a lower dimensional change rate (water absorption, linear expansion coefficient) than polyacetal (POM), which has a relatively high dimensional change rate among known general-purpose resin materials, is more preferably used. Specifically, the water absorption of the material is preferably 0.22 mass % or less. The linear expansion coefficient of the material is preferably $11 \times 10^{-5}$/° C. or less.

The connector may be used for eight years or more in maximum. Thus, the material preferably maintains sufficient strength over a long period of time. Note that the material more preferably has higher strength characteristics (tensile strength, bending strength) than polyphenylene ether (PPE), which is known to be less likely to get damaged even after long-term use from studies of the inventors. Specifically, the tensile strength of the material is preferably 50 MPa or more. The bending strength of the material is preferably 76 MPa or more.

Polyphenylene sulfide (PPS) is particularly preferably used as such a material.

Note that the constituent material of annular member 5 is preferably similar to the material of the connectors 7, 8.

(Overall Configuration of Hollow Fiber Membrane Module Etc.)

Preferably, clearance 1a extending in the longitudinal direction inside an inner wall of pressure vessel 1 is present between hollow fiber membrane elements 4 (the feed liquid can flow between adjacent hollow fiber membrane elements 4). For example, connecting hollow fiber membrane elements 4 to each other using, snap 51 described above eliminates the necessity of sealing a space between hollow fiber membrane elements 4 and pressure vessel 1 with, for example, an O-ring to fix hollow fiber membrane elements 4. Thus, such a clearance 1a can be left.

The hollow fiber membrane element preferably has a cylindrical shape. The hollow fiber membrane element preferably has an outer diameter of 10 to 28 cm. The hollow fiber membrane element preferably has a total length of 1000 to 2000 mm.

With mainly reference to FIG. 1, the feed liquid having a predetermined pressure is fed through the feed port 10a, passes through outer channel 21a of connector 7, flows out of perforated distribution tube 21 through holes 21b, and is fed to outside 42 of hollow fiber membrane 41. The feed liquid that has passed through outside 42 of hollow fiber membrane 41 in such a manner as to flow outward in the radial direction of the hollow fiber membrane element 4 flows through clearance 1a and is discharged to outside through discharge port 10b.

Accordingly, water (permeated water) that has passed through hollow fiber membrane 41 from outside 42 of hollow fiber membrane 41 and moved to hollow portion 41a flows out through openings at both ends of hollow fiber membrane 41. Further, the permeated water passes through recess 52, flows to second channel 72 (main channel) through hole 73 (branch channel) of connector 7, and flows into inner channel 22a of inner tube 22. Then, the permeated water inside inner channel 22a is taken out through recovery port 11 connected with inner tube 22.

Note that although recovery port 11 is provided at one end in the longitudinal direction of hollow fiber membrane element 4 in FIG. 1, recovery port 11 may be provided at each end thereof.

Further, although feed port 10a, discharge port 10b, and recovery port 11 are provided at both ends of pressure vessel 1 in FIG. 1, the present invention is not limited to such an example, and appropriate change can be made. For example, feed port 10a, discharge port 10b, and recovery port 11 may be provided on an outer peripheral portion of pressure vessel 1.

According to the hollow fiber membrane module of the present embodiment, the feed liquid having the same concentration is fed to all hollow fiber membrane elements 4 through outer channels 21a. This enables all hollow fiber membrane elements 4 to effectively exhibit the performance of membrane treatment such as reverse osmosis treatment or forward osmosis treatment. As a result, it is possible to improve the overall treatment efficiency (e.g., water producing efficiency) of the hollow fiber membrane module including the plurality of hollow fiber membrane elements.

EXAMPLES

Hereinbelow, the present invention will be described in more detail with examples. However, these examples are not intended to limit the scope of the invention.
(Measurement of Pressure Loss)

A hollow fiber membrane module was connected to a test facility where a feed water tank, a high pressure pump, a feed water pressure gauge, an inter-module differential pressure gauge, a permeated water flowmeter, and concentrated water flowmeter were installed. Measurement was performed using the inter-module differential pressure gauge in a state where a water producing operation was performed under the following measurement conditions. The measurement conditions include a feed water pressure of 5.39 MPa, a feed water concentration of 3.5 wt % (sodium chloride), a feed water temperature of 25° C., and a recovery rate of 30%. Note that the recovery rate was calculated by dividing a value measured by the permeated water flowmeter by the sum of a flow rate value of the permeated water and a flow rate value of the concentrated water, and converting the obtained quotient into percentage.
(Measurement of Water Permeability)

Measurement was performed using the permeated water flowmeter in a state where the hollow fiber membrane module was connected to the test facility described above and the water producing operation was performed under the above measurement conditions.

Example 1

A hollow fiber membrane module of Example 1 (refer to FIG. 1) includes a pressure vessel, and two hollow fiber membrane elements which are connected to each other using a connector (a four-hole connector including four second channels: refer to FIGS. 3 to 7) and housed inside the pressure vessel. Note that the hollow fiber membrane element has a diameter of 20 cm and a total length of 1016 mm. The hollow fiber membrane element includes a double-core tube as illustrated in FIG. 1, and the outer diameter of the double-core tube is 72 mm.

A reverse osmosis treatment with a permeated water recovery rate from a feed liquid of 30 mass % was performed using the hollow fiber membrane module of Example 1 under the conditions where the pressure of the feed liquid was 5.39 MPa the NaCl concentration was 3.5 mass %, and the temperature was 25° C. In this case, the water permeability of the hollow fiber membrane module was 35 m$^3$/day, and the pressure loss was 16 kPa.

Example 2

A hollow fiber membrane module of Example 2 is the same as the hollow fiber membrane module of Example 1 except that a three-hole connector including three second channels is used.

A reverse osmosis treatment was performed using the hollow fiber membrane module of Example 2 under the same conditions as Example 1. In this case, the water permeability of the hollow fiber membrane module was 35 m$^3$/day, and the pressure loss was 17 kPa.

The result shows that even if the number of second channels of the connector is changed, the performance is maintained at nearly the same level.

Example 3

A hollow fiber membrane module of Example 3 is the same as the hollow fiber membrane module of Example 1 except that four hollow fiber membrane elements (diameter: 20 cm, total length: 1,016 mm) are housed inside the same pressure vessel as Example 1.

A reverse osmosis treatment was performed using the hollow fiber membrane module of Example 3 under the same conditions as Example 1. In this case, the water permeability of the hollow fiber membrane module was 69 m$^3$/day, and the pressure loss was 17 kPa.

The water permeability in Example 3 is approximately twice the water permeability in Example 1, which shows that the hollow fiber membrane module including three or more hollow fiber membrane elements communicating with each other can also exhibit sufficient water permeability.

Example 4

A hollow fiber membrane module of Example 4 is the same as the hollow fiber membrane module of Example 1 except that two hollow fiber membrane elements (diameter: 28 cm, total length: 1400 mm) are housed.

A reverse osmosis treatment was performed using the hollow fiber membrane module of Example 4 under the same conditions as Example 1. In this case, the water permeability of the hollow fiber membrane module was 106 m$^3$ day, and the pressure loss was 21 kPa.

Comparative Example 1

A hollow fiber membrane module of Comparative Example 1 includes the same pressure vessel as Example 4, and the same two hollow fiber membrane elements as Example 4 housed inside the pressure vessel. The two hollow fiber membrane elements are connected to each other using a conventional connecting member. The conventional connecting member used in Comparative Example 1 cannot allow double-core tubes of the two connected hollow fiber membrane elements to communicate with each other. Thus, the ports of the pressure vessel are changed so as to feed and discharge the feed liquid and recover the permeated water independently in each hollow fiber membrane element.

A reverse osmosis treatment was performed using the hollow fiber membrane module of Comparative Example 1 under the same conditions as Example 1. In this case, the water permeability of the hollow fiber membrane module was 106 m³/day, and the pressure loss was 37 kPa.

The result shows that, when Example 4 and Comparative Example 1 have the same water permeability, the pressure loss is reduced to a greater extent in Example 4 than in Comparative Example 1. This shows that the hollow fiber membrane module of Example 4 can more efficiently exhibit the water permeability than the hollow fiber membrane module of Comparative Example 1. That is, in Example 4, increasing the pressure of the feed liquid naturally leads to higher water permeability.

REFERENCE SIGNS LIST

1: pressure vessel, 1a: clearance, 10a: feed port, 10b: discharge port, 11: recovery port, 13, 14: wall member, 2: double-core tube, 21: perforated distribution tube, 21a: outer channel, 21b: hole, 22: inner tube, 22a: inner channel, 4: hollow fiber membrane element, 41: hollow fiber membrane, 41a: hollow portion, 42: outside of hollow fiber membrane, 5: annular member, 51: snap, 52: recess, 6: resin wall, 61, 62: plug, 63: support wall, 7, 8: connector, 71, 81: first channel, 72, 82: second channel, 73, 83: hole, 84: projection, 71a, 72a, 81a, 82a, 84a: groove

The invention claimed is:

1. A hollow fiber membrane module comprising:
a pressure vessel;
a plurality of hollow fiber membrane elements arranged in series inside the pressure vessel; and
a connector that connects the hollow fiber membrane elements to each other, wherein
the pressure vessel includes:
   a feed port for a feed liquid provided on one end in a longitudinal direction;
   a discharge port for the feed liquid provided on the other end in the longitudinal direction; and
   a recovery port for permeated water,
each of the hollow fiber membrane elements includes:
   a plurality of hollow fiber membranes; and
   a double-core tube extending in a longitudinal direction of the plurality of hollow fiber membrane elements,
the double-core tube includes a perforated distribution tube, and an inner tube disposed inside the perforated distribution tube,
an outer channel defined by an inner wall of the perforated distribution tube and an outer wall of the inner tube communicates with the feed port and the discharge port,
an inner channel defined by an inner wall of the inner tube communicates with the recovery port,
the connector includes a first channel and a second channel that do not communicate with each other, and between the hollow fiber membrane elements,
the outer channels of the hollow fiber membrane elements are connected to each other through the first channel, and
the inner channels of the hollow fiber membrane elements are connected to each other through the second channel, and hollow portions of the hollow fiber membranes communicate with the inner channels through the second channel.

2. The hollow fiber membrane module according to claim 1, wherein a clearance extending in a longitudinal direction inside an inner wall of the pressure vessel is present between the hollow fiber membrane elements.

3. The hollow fiber membrane module according to claim 1, wherein the second channel includes a main channel for connecting the inner channels to each other, and a branch channel that allows the hollow portions of the hollow fiber membrane element to communicate with the main channel.

4. The hollow fiber membrane module according to claim 1, wherein the hollow fiber membrane element has a cylindrical shape, has an outer diameter of 10 to 28 cm, and has a total length of 1000 to 2000 mm.

5. The hollow fiber membrane module according to claim 1, wherein the plurality of hollow fiber membrane elements includes a hollow fiber membrane wound body including a plurality of hollow fiber membranes helically wound around the double-core tube.

6. A connector for connecting a plurality of hollow fiber membrane elements to each other, comprising
a first channel and a second channel that do not communicate with each other,
an annular member fitted to outer peripheral faces of the connector, the annual member provided with a recess,
wherein between the hollow fiber membrane elements, outer channels of the hollow fiber membrane elements are connected to each other through the first channel, and inner channels of the hollow fiber membrane elements are connected to each other through the second channel, and
wherein the hollow fiber membranes communicate with the second channel through the recesses of the annular members.

7. The connector according to claim 6, wherein a hollow portion of a hollow fiber membrane communicates with the second channel of the connector.

8. The connector according to claim 6, wherein a material constituting the connector at least one selected from the group consisting of polyphenylene sulfide (PPS), polyphenylene ether (PPE), polyacetal (POM), polyvinyl chloride (PVC), polyetheretherketone (PEEK), and acrylonitrile-butadiene-styrene (ABS) resins.

9. The connector according to claim 8, wherein a linear expansion coefficient of the material is $11 \times 10^{-5}/°C$. or less.

* * * * *